United States Patent Office 3,537,312
Patented Nov. 3, 1970

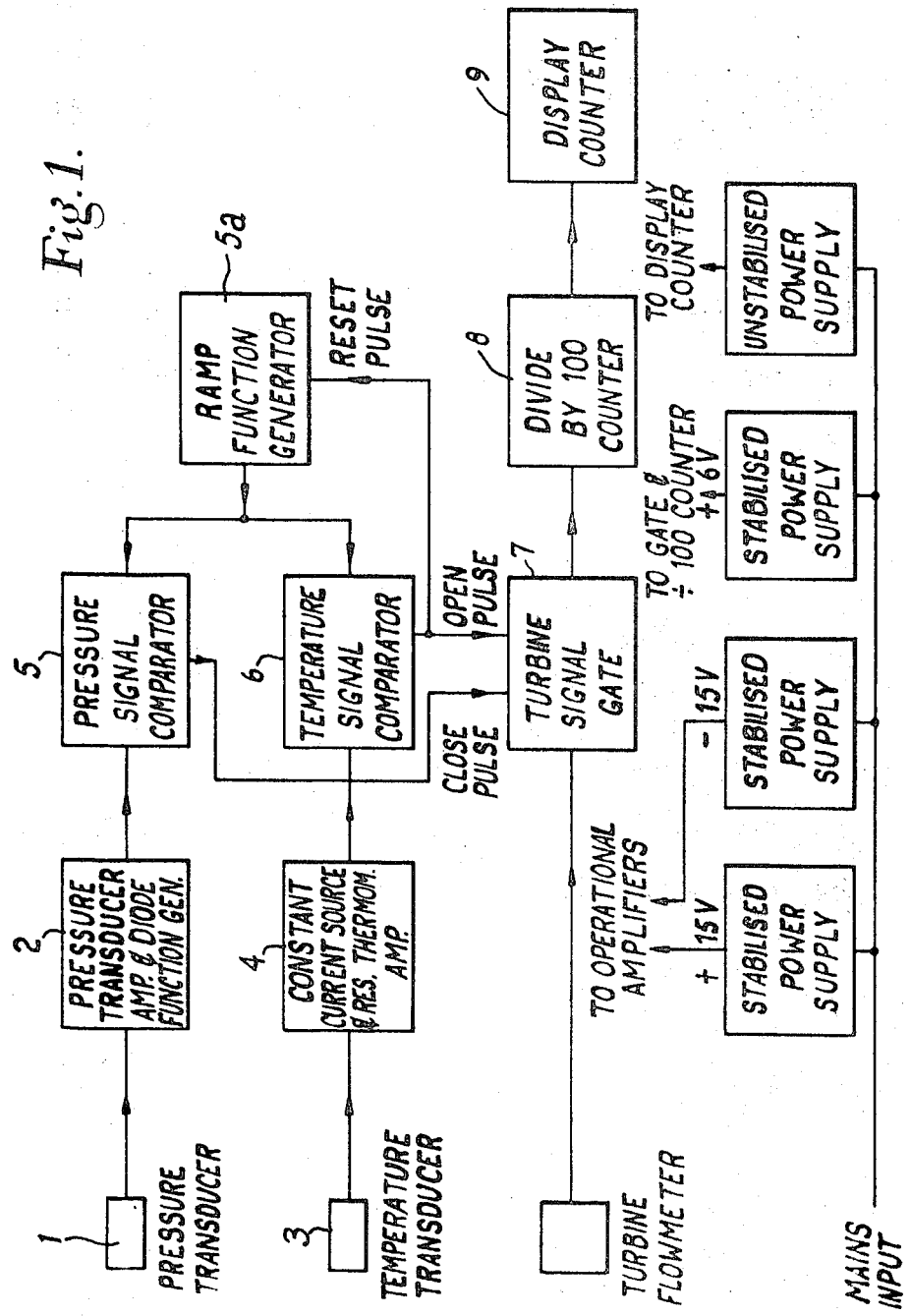

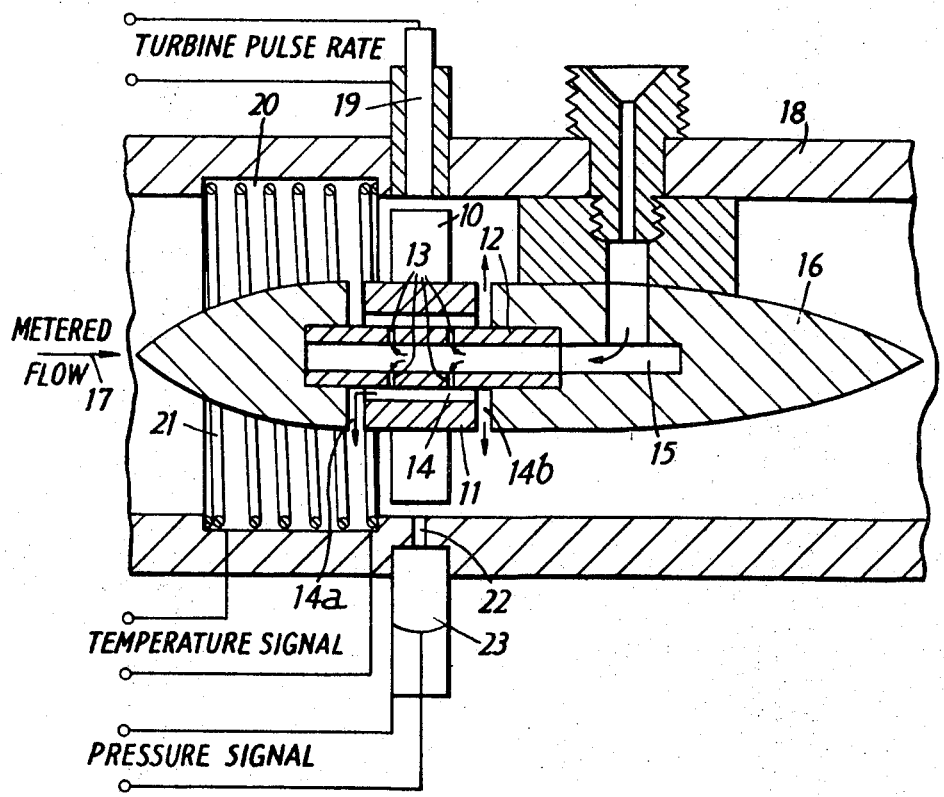

3,537,312
MASS FLOW MEASURING APPARATUS
Reginald Charles Moore, Harpenden, England, assignor to Westwind Turbines Limited, Branksome, Poole, Dorset, England, a body corporate
Filed June 21, 1968, Ser. No. 738,970
Int. Cl. G01f 1/00
U.S. Cl. 73—231      4 Claims

ABSTRACT OF THE DISCLOSURE

A mass flow measuring apparatus provides a first signal voltage linearly proportional to absolute temperature of the fluid in flow, a second signal voltage linearly proportional to absolute pressure of the fluid in flow, a fluid-bearing turbine producing pulses at a rate linearly proportional to its rotation by the fluid, a pulse-operable counter, a gate interposed between the pulse source and the counter, a ramp voltage varying linearly with time, means comparing the temperature signal voltage with the ramp voltage and then opening the gate, and means for comparing the pressure signal voltage with the ramp voltage and then closing the gate.

---

This invention relates to the mass flow measurement of fluids, its object being to provide an improved apparatus utilising electrical signals derived from the three functions of velocity, absolute temperature and absolute pressure so as to provide a direct reading in convenient units of weight.

According to the present invention a mass flow measuring apparatus comprises means for deriving an electrical signal the voltage of which is linearly proportional to absolute temperature of a fluid in flow, means for deriving an electrical signal the voltage of which is linearly proportional to absolute pressure of the fluid in flow, a turbine having a fluid bearing and driven by the fluid in flow, means on the turbine to produce electrical pulses at a rate linearly proportional to the rate of rotation of the turbine, a pulse-operable counter, a gate interposed between the pulse producing means and the counter, means for producing a ramp voltage varying linearly with time, means for comparing the temperature signal voltage with the ramp voltage and producing when said voltages achieve a predetermined relationship a signal serving to open the gate, and means for comparing the pressure signal voltage with the ramp voltage and for producing when said voltages achieve a predetermined relationship a signal serving to close the gate.

In a preferred arrangement, the gate-opening signal may be fed to the means for producing the ramp voltage, thereby to re-set the ramp voltage to a starting value, such as zero. The gate opens and closes repeatedly during normal operation of the system.

With such an arrangement, the pulses produced according to the rate of flow are passed to the counter for so long as the gate remains open, but do not pass to the counter when the gate is closed.

Accordingly, the number of pulses reaching the counter in a given unit of time is directly proportional to the velocity of flow, directly proportional to the absolute pressure, and inversely proportional to the absolute temperature, and is thus a measure of mass flow.

If the pressure-density relationship of the gas is inherently non-linear, the output may be suitably corrected. Thus, in a preferred embodiment, an electrical signal the voltage of which is linearly related to pressure, is combined with an amplifier and a diode function generator adapted to correct the output signal so as to be linearly proportional to density. A convenient form of linear pressure transducer is a strain gauge diaphragm type of transducer.

In the preferred embodiment, the means for deriving an electrical signal the voltage of which is directly proportional to absolute temperature comprises a constant-current source and a resistance thermometer, the current being passed through the resistance and the output voltage used as a signal.

A preferred embodiment of apparatus incorporating such pressure and temperature transducers, and a turbine pulse source, suitable for use with the apparatus of the present invention, is described in our United Kingdom Pat. Ser. No. 1,086,628.

In order that the nature of the invention may be readily ascertained, an embodiment of mass flow measuring device for gases is hereinafter particularly described with reference to the accompanying drawings, wherein:

FIG. 1 is a block circuit diagram; and
FIG. 2 is a central vertical section of a transducer assembly.

In order to determine mass flow of a gas along a path it is necessary to establish three factors, viz (i) the velocity of flow, (ii) the absolute temperature, and (iii) the absolute pressure of the gas.

For the purposes of this description it is assumed that a means for determining velocity of gas flow along a path may include a turbine rotor (described below in relation to FIG. 2) adapted to produce electrical pulses at a rate determined by its rate of rotation and thus directly proportional to the velocity of the gas. It is appreciated that the turbine cannot be perfectly frictionless but allowance can be made for any minor difference involved between indicated velocity and true velocity.

Conventional transducers are already known for providing an electrical signal derived linearly from the absolute temperature factor and from the absolute pressure factor.

Over the range of process temperatures and pressures, e.g. 0°–20° C. and 100–350 p.s.i.g., which the apparatus is intended to be used in one particular application, the density of a gas varies linearly with the temperature, within approximately ±1%, but non-linearly with pressure. The output from a temperature transducer can accordingly be used with linear amplification, but the output from a pressure transducer must be corrected by use of an amplifier having a suitable non-linear characteristic.

Referring to FIG. 1 of the drawing, the output from a pressure transducer, e.g. of the known strain-gauge type, (see FIG. 2), is passed to an amplifier and diode function generator unit 2 so as to give a voltage output which is proportional to density.

A temperature transducer 3 is in the form, for example, of a resistance thermometer (see FIG. 2) through which there is passed a constant current derived from a source 4, the voltage produced across the resistance thermometer 3 being passed through an amplifier in the source 4 to produce an amplified voltage.

A generator 5a is arranged to produce a voltage which varies linearly with time, and which will be referred to herein as the ramp voltage.

The pressure signal coming from unit 2 and the temperature signal coming from source 4 are each compared with the ramp voltage in respective comparators 5 and 6. When the temperature signal voltage equals that of the ramp signal, the ramp signal voltage is automatically reset to zero and the temperature signal comparator 6 produces a pulse which is fed to a gate 7 and then opens the gate 7.

The gate 7 receives pulses coming from the turbine velocity gauge, and opening of the gate 7 allows these velocity pulses to pass, via a reducing counter 8 to a display counter 9.

When the pressure signal voltage equals the ramp voltage, the pressure signal comparator 5 produces a pulse which then closes the gate 6 and stops any further turbine velocity pulses reaching the counters 8, 9 for the remainder of that cycle. Accordingly, for a given duration, the total pulse count displayed on counter 9 is directly proportional to the velocity and to the pressure signal voltage, and inversely proportional to the temperature signal voltage, and is therefore a measure of the mass flow of the gas. This result can be shown on the display in any convenient units, e.g. in pounds weight.

In practice errors may be introduced by the electronic system comprising the comparators, the ramp function generator, the gate and the counters, but these may be made small, i.e. of the order of 0.1%.

Other errors may arise in the pressure transducer and the diode function generator, and in the turbine due to mechanical resistance. To overcome this, the diode function generator may be set up in accordance with density/pressure/temperature curves obtained experimentally, and overall accuracy will depend upon these experimental figures. It has been found in practice that the apparatus as a whole may be made readily to operate with an accuracy within ±1%.

FIG. 2 illustrates an assembly of transducers. A bladed turbine 10 has an outer bearing sleeve 11 which surrounds, with clearance, a fixed inner bearing sleeve 12. Radial holes 13 are provided in the inner sleeve for the passage, to the gap 14 defined between the inner and outer bearing sleeves, of compressed air fed through an axial passage 15 in a nacelle 16 disposed axially in a gas stream 17 flowing through a conduit 18. The air exhausts at both ends of the radial bearing to provide axial end bearings at 14a and 14b. The amount of air exhausted from the bearing spaces 14a and 14b is negligible in comparison with the flow to be measured, and can be ignored. Due to the extremely low resistance to rotation given by the use of such an "air bearing," the rotor 10 can rotate at a speed which is linearly proportional to the volumetric flow of gas along the conduit 18. The rotor 10 has its blades arranged to be capable of coacting either capacitatively, as one plate of a condenser, or magnetically, with a magnetic probe 19 situated in the wall of the conduit 18.

Slightly upstream of the rotor there is provided, in the wall of the conduit 18, an annular recess 20 housing a coiled copper resistance thermometer 21 which accordingly does not impede the flow or cause turbulence.

Radially opposite to the rotor there is provided an opening 22 in the wall of the conduit 18 leading to a diaphragm type pressure transducer 23.

I claim:
1. A mass flow measuring apparatus, comprising:
   a turbine having a rotor driven by the fluid in flow and having a fluid bearing rotatably supporting said rotor,
   an electrical pulse generator drivingly connected to said turbine and adapted to produce electrical pulses at a rate linearly proportional to the rate of rotation of said turbine,
   a pulse-operable counter,
   a turbine signal gate connected between said pulse generator and said counter and having a gate-opening circuit and a gate-closing circuit,
   a temperature transducer arrangement adapted to emit a temperature-responsive signal the voltage of which is linearly proportional to the absolute temperature of the fluid in flow,
   a temperature signal amplifier connected to said temperature transducer,
   a temperature signal comparator having an input connected to said temperature signal amplifier and having an output operatively connected to said gate-opening circuit,
   a pressure transducer adapted to emit a pressure-responsive electrical signal the voltage of which is linearly proportional to the absolute pressure of the fluid in flow,
   a pressure signal amplifier connected to said pressure transducer,
   a pressure signal comparator having an input connected to said pressure signal amplifier and an output operatively connected to said gate-closing circuit,
   and a ramp voltage generator adapted to produce a ramp voltage varying linearly with time and having an output connected to said temperature signal comparator and to said pressure signal comparator and having a reset pulse input connected to said pressure signal comparator output,
   said temperature signal comparator being constructed and arranged to compare the temperature signal voltage with the ramp signal voltage and emit a gate-opening signal to said gate-opening circuit to open said gate in response to the attainment of a predetermined relationship between said temperature signal voltage and said ramp voltage,
   said pressure signal comparator being constructed and arranged to compare the pressure signal voltage with the ramp voltage and emit a gate-closing signal to said gate-closing circuit to close said gate in response to the attainment of a predetermined relationship between said pressure signal voltage and said ramp voltage,
   said reset pulse input being responsive to the reception of a gate-closing signal from said temperature signal comparator to reset the voltage of the ramp voltage generator to a predetermined starting value.

2. A mass flow measuring apparatus, as claimed in claim 1, wherein a diode function generator is connected to said pressure signal amplifier and is constructed and arranged to correct said pressure-responsive signal so as to be linearly proportional to the density of the fluid in flow.

3. A mass flow measuring apparatus, as claimed in claim 2, wherein said pressure transducer is a strain gauge transducer.

4. A mass flow measuring apparatus, as claimed in claim 1, wherein said temperature transducer comprises a constant current source and a resistance thermometer.

References Cited

UNITED STATES PATENTS 2,859,619  11/1958  Fellows _____ 73—231
3,385,108  5/1968   Rosso _____ 73—194

FOREIGN PATENTS 1,086,628  10/1967  Great Britain.

RICHARD C. QUEISSER, Primary Examiner

J. K. LUNSFORD, Assistant Examiner

U.S. Cl. X.R.

73—194